June 12, 1923.
W. G. CLARK
1,458,522
FEED TROUGH FOR GLASS FURNACES
Filed May 27, 1920
2 Sheets-Sheet 1
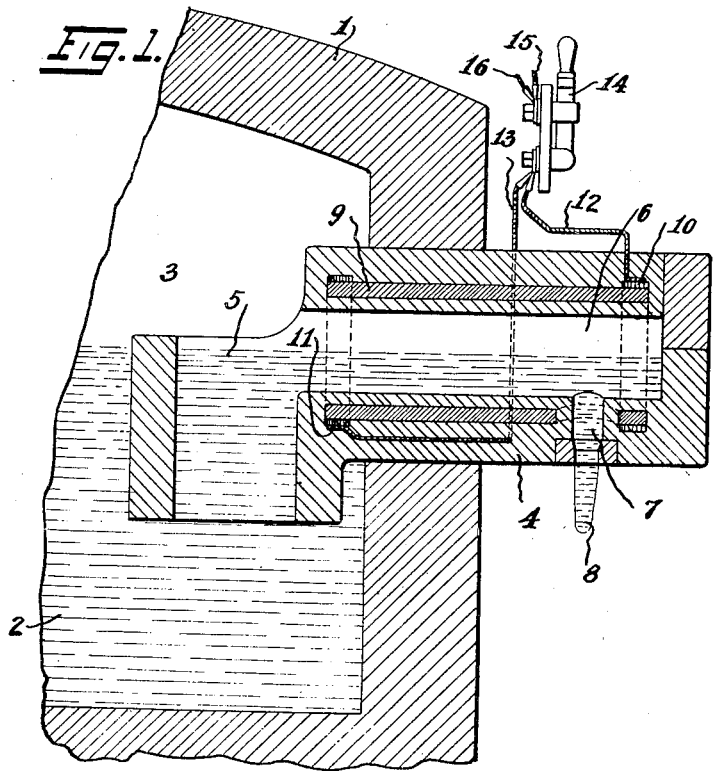
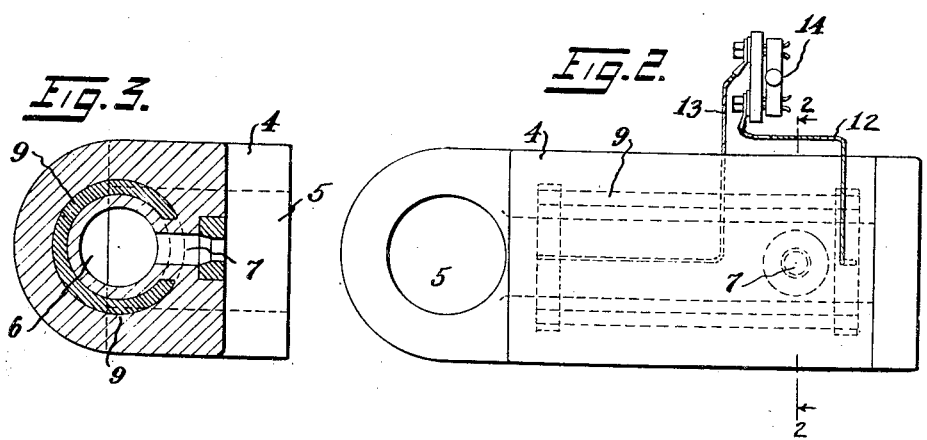
WITNESSES:
INVENTOR
Walter G. Clark,
BY
ATTORNEY

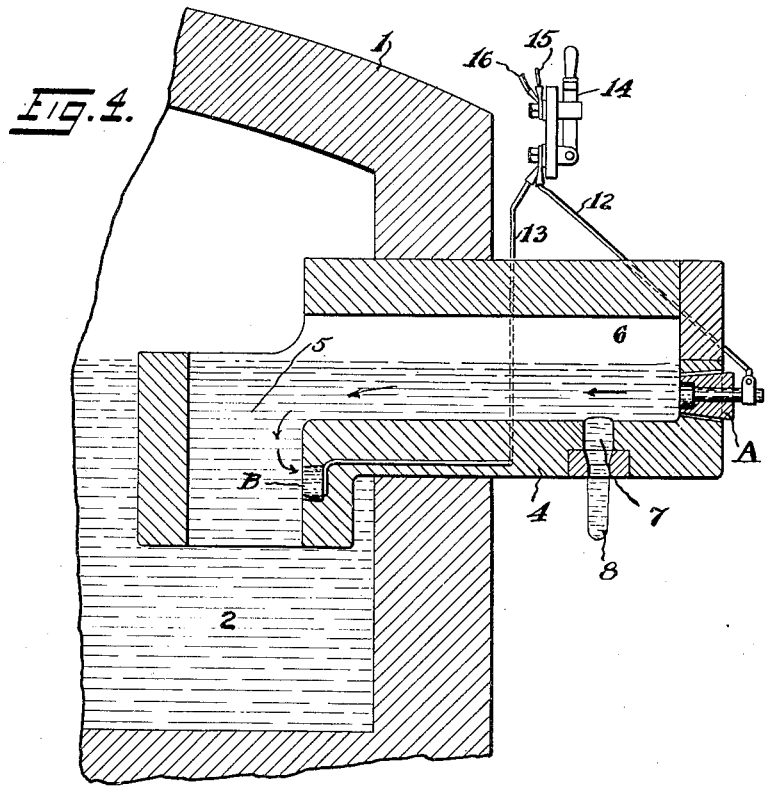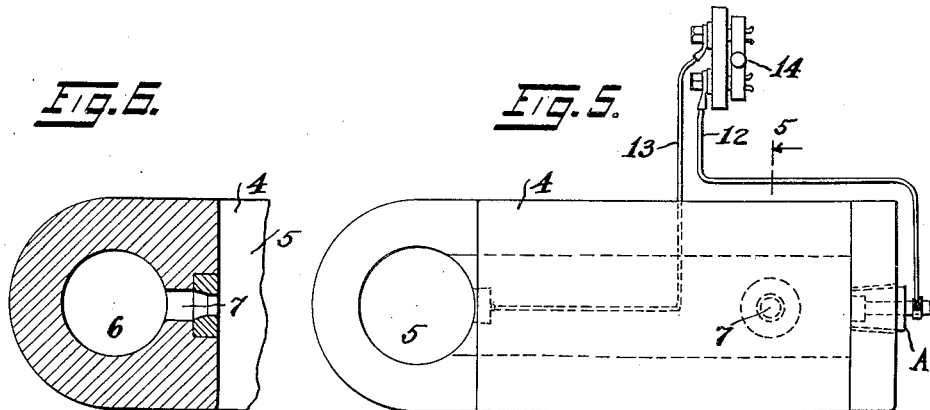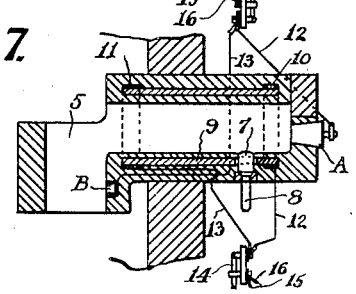

Patented June 12, 1923.

1,458,522

UNITED STATES PATENT OFFICE.

WALTER G. CLARK, OF NEW YORK, N. Y.

FEED TROUGH FOR GLASS FURNACES.

Application filed May 27, 1920. Serial No. 384,654.

*To all whom it may concern:*

Be it known that I, WALTER G. CLARK, a citizen of the United States, residing in New York, in the county of New York and State of New York, have invented certain new and useful Improvements in Feed Troughs for Glass Furnaces, of which the following is a specification.

My present invention relates to an improvement in feed troughs for glass furnaces, and has to do with means whereby to overcome the trouble heretofore encountered with the melting of chilled glass left in furnaces from a previous heat.

When a glass furnace is shut down and the heat withdrawn therefrom, that portion of the furnace from which the molten glass is withdrawn, and known as the feed trough or spout, is often filled with glass and becomes set.

The chilling or "freezing" of the glass in the trough is troublesome for the reason that, when heat is reapplied to the main body of the furnace and the glass therein becomes molten, the trough is usually so far distant from the source of heat that some considerable period of time elapses after the glass in the body of the furnace has become molten, before the glass in the trough also becomes plastic enough to be withdrawn therefrom.

Another disadvantage in the use of a long feed trough, when the use of such is desirable, is due to the fact that, in drawing glass therethrough, it loses some of its heat and therefore is not of the same temperature as the glass in the body of the furnace owing to such loss of heat, and my invention provides additional advantages by the introduction of means whereby the glass in the trough may be kept at a high temperature through the introduction of supplemental heating means thereto, and from an entirely different source and manner, than the heat supplied to melt the glass mass in the body of the furnace.

The advantage of the foregoing will be appreciated by one skilled in the art.

Other features and advantages may be ascertained from a perusal of the drawings and the following description.

In the drawings,

Figure 1 shows a sectional fragmentary view of a furnace embodying my preferred form of invention;

Fig. 2 is a plan view showing a plan elevation of the trough removed from the furnace;

Fig. 3 is a sectional view taken on the line 2—2, Fig. 2;

Fig. 4 is a fragmentary sectional view of a modification of my device;

Fig. 5 is a plan view of the feed trough removed from the body of the furnace;

Fig. 6 is a sectional view taken on the line 5—5, Fig. 5; and

Fig. 7 is a sectional view of a combination of both modifications.

In my preferred form of construction, Fig. 1, is shown a furnace generally denoted by 1, having a mass of molten glass 2 within the melting chamber 3 thereof, and, introduced in the customary manner, is an upflowing glass feed trough generally denoted by 4 consisting of a riser chamber 5 through which the glass rises upwardly from below its level within the chamber 6 of the trough 4 near the outer end thereof, and at the bottom is located a port 7 through which the glass stream 8 flows downwardly as required.

Within the interior of the trough 4 are located electric terminals 10 and 11 respectively, to which conductor wires 12 and 13 are attached, the same running outwardly to any desired point, being there connected up to a single throw knife switch generally denoted by 14. The wires 15 and 16 at the upper end of said switch are respectively connected to any suitable source of electric current, not shown.

After the glass has become chilled in the furnace, and upon starting of the heat under the main body of the glass, in order to reduce the same to molten state, it is desirable to reduce the glass in the riser chamber 5 and also in the trough chamber 6 to a molten state simultaneously with the melting of the main glass mass so that, when gas or any other source of heat is applied to the body of the furnace, the knife switch 14 may be thrown in thereby connecting the electrical resistance member 9 into an electric circuit and immediately the said resistance member becomes sufficiently hot to heat the glass in the trough to a sufficient degree to cause the glass therein to become molten, thereby speeding up the melting of the entire mass and its removal therefrom without having to wait for radiated heat to reach the glass in the chambers 5 and 6. By the time the mass of glass within the chamber 3 has become molten, that glass in chambers 5 and 6 which would ordinarily be the last to become molten is reduced to plastic state at about the same time as the main mass of glass, thereby permitting the glass to be withdrawn from the furnace sooner than otherwise would be the case, and thereby obviating the long wait usually necessary and increasing the output of molten glass.

In Fig. 2 the feed trough is shown in plan view, removed from the furnace and reduced, and, as shown in Fig. 1, Figure 5 also shows the corresponding switch 14, conductors 12 and 13, the resistance member 9 within the body of the feed trough 4, the riser chamber 5 and the pouring vent 7. The last noted vent 7 is also more clearly shown in section in Fig. 3, said sections being taken on the line 2—2, Fig. 2, looking in the direction of the arrows.

An alternate or modified form of my system of heating molten glass is shown in Fig. 4, whereby, while the glass may be heated after it is melted in the apparatus described in Fig. 1. This form of construction essentially comprises similar elements which are numbered in correspondence with similar elements shown in Fig. 1, with a different form of electrical arrangement for internally heating the glass after it is melted by the foregoing described apparatus.

In the present instance, I disconnect the resistance element 9 as shown in Fig. 1, and substitute therefor a pair of terminals A and B, which terminals conduct electric current from the previously described sources to and through (internally of) the mass of molten glass within the chamber 6 and the riser 5, the current following in the direction of the arrows through the glass mass between the terminals A and B.

In the second modification, I take advantage of the fact that glass, when reduced to molten state, becomes a conductor for electric current and that the passage of sufficient quantities of electric current therethrough, while in the molten state, increases the internal temperature thereof thereby greatly increasing its fluidity through the passage of current therethrough.

Owing to the use of the combined modifications shown in Figs. 1 and 4, it is therefore obvious that it is possible to greatly increase the output of glass from a furnace for the following reasons: First, the glass in the glass feed-trough may be expeditiously melted by means of the device shown in Fig. 1, without having to wait for the heat from the main body of the furnace to reach the same, and after the glass therein has reached the desired state, it may be either kept molten by continued application of current through the resistance member 9, or the current may be introduced directly in the mass of glass within the feed trough as shown in Fig. 4 by the combination of these two devices in a single feed trough as indicated in the smaller view, Fig. 7, so that the glass may even be made more fluid by the addition of electric current passing directly through the body of the glass itself within the feed trough so that it will flow more freely than would be possible in the present practice. Both the quick reduction of the glass in the feed trough in the modification shown in Fig. 1, and the greater degree of heat that may be introduced into the glass in the modification shown in Fig. 4, will speed up the melting and withdrawing the glass therefrom, thereby creating a greater flow and amount of product from the furnace of a given type than when equipped with the old form of feed trough.

In the view, Fig. 7, which is a combination of the two heating devices shown in Figs. 1 and 4, the like parts are, in both combinations, given like characters, and it is thought that this view will be thoroughly understood without any further reference thereto. In this device, either the modification of external heater as shown in Fig. 1 may be utilized first, and the second modification shown in Fig. 4 may be thereafter used in sequence, cutting out the external heater and introducing an electrical current through the mass of the molten glass between the two terminals A and B.

Owing to a peculiarity which I have discovered in the handling of a glass mass in this manner, it has been ascertained that direct current cannot be used for passing through the body of the molten glass owing to the fact that direct current has a tendency to decompose the oxides of the glass into their metallic forms. This is also true of low frequency alternating current, but it has been discovered that high frequency alternating current performs the functions herein satisfactorily, and that no decomposition occurs with alternating current at or about sixty cycles or higher.

With regard to the current for the external heater member 9, as shown in Fig. 1, obviously either direct or alternating current of sufficient pressure may be used, it being merely necessary to provide sufficient and proper heater element means to obtain the desired temperatures. Therefore it is possible to use any form of electric current with the external heater means and high frequency alternating current for the internal resistance current, or that current which passes thru the molten glass mass and which is conducted thereby owing to its being more conductive while molten than while in the cold state.

It is obvious that various changes and modifications may be made to the details of construction without departing from the spirit or scope thereof.

I claim:

1. In combination, a furnace; a feed trough; heating means associated with said trough whereby to melt glass within the trough; and a second heating means comprising electrodes in communication with the interior of the trough.

2. In combination, a furnace; a feed trough therefor; an electric-resistance heating means associated with said trough; a second heating means comprising electrodes in communication with the interior of the trough; and means whereby current may be supplied to said heating means.

3. In combination, a furnace; a feed trough therefor comprising a horizontal portion; an electric-resistance heating means associated with said trough and extending substantially from end to end of the horizontal portion; a second heating means comprising electrodes in communication with the interior of the trough at opposite ends therefor; and means whereby current may be supplied at will to either or both of said heating means.

4. In combination, a furnace; a feed trough therefor comprising a horizontal portion; an electric-resistance heating means associated with said trough and completely embedded in the walls thereof and extending substantially from end to end of the horizontal portion whereby to melt the glass within said trough; a second heating means comprising electrodes in communication with the interior of the trough at opposite ends thereof, whereby the glass may be maintained in molten state by passing a heating current through the molten glass; and a pair of controllable electric current supply means whereby current may be supplied at will to said resistance heating means or said second means or both.

5. In combination, a furnace; a feed trough therefor comprising a horizontal portion having at the inner end a riser chamber open at both ends; and an electric heating means associated with said portion and riser chamber for heating the interior of the trough substantially from end to end.

6. In combination, a furnace; a feed trough therefor comprising a horizontal portion having a closed outer end wall and a downwardly opening port near its outer end and having at the inner end an upflowing glass feed trough consisting of a riser chamber open at both ends and extending somewhat above the axis of the housing through which the glass rises upwardly from below its level within said chamber; and heating means associated with said riser chamber whereby to heat the glass within said riser chamber.

7. In combination, a furnace; a feed trough therefor comprising a horizontal portion having a closed outer end wall and a downwardly opening port near its outer end and having at the inner end an upflowing glass feed trough consisting of a riser chamber open at both ends and extending somewhat above the axis of the housing through which the glass rises upwardly from below its level within said chamber; an electric-resistance heating means associated with said trough and completely embedded in the walls thereof and extending substantially from end to end of the horizontal portion whereby to melt the glass within said trough; a second heating means comprising electrodes in communication with the interior of the trough at opposite ends thereof, whereby the glass may be maintained in molten state by passing a heating current through the molten glass; and a pair of controllable electric current supply means whereby current may be supplied at will to said resistance heating means or said second means or both.

WALTER G. CLARK.

Witnesses:
H. D. PENNEY,
ACHILLES ROVEGNO.